UNITED STATES PATENT OFFICE.

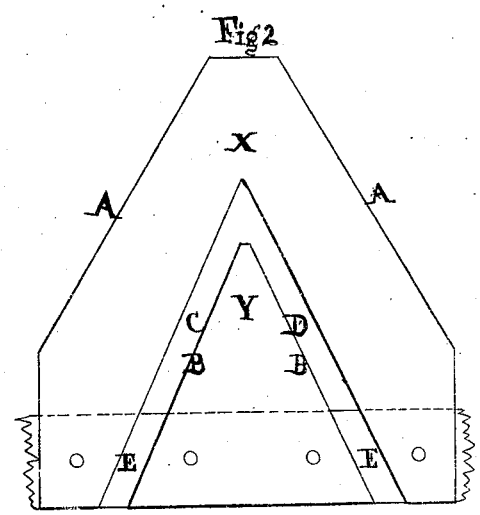
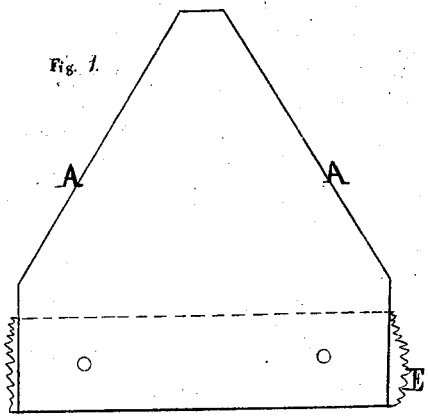
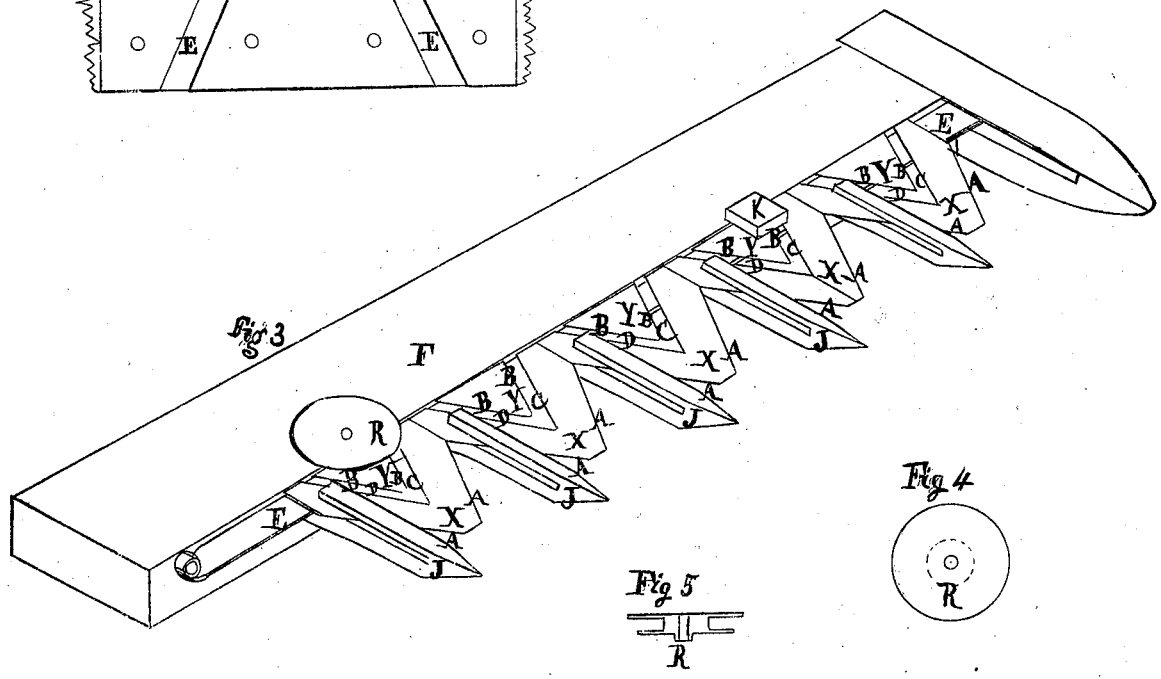
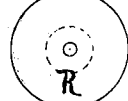

ISRAEL S. LOVE, OF BELOIT, WISCONSIN.

IMPROVEMENT IN HARVESTER-CUTTERS.

Specification forming part of Letters Patent No. 14,402, dated March 11, 1856.

*To all whom it may concern:*

Be it known that I, ISRAEL S. LOVE, of Beloit, in the county of Rock and State of Wisconsin, have invented a new and useful Improvement in the Grass-Cutting Blades for Mowing and Reaping Machines, by means of which they are made to perform their work more perfectly than heretofore; and I do hereby declare that the following is a full and exact description thereof, reference being had to the accompanying drawings, and to the letters of reference marked thereon.

I will illustrate the nature of my improvement by first describing the usual form of the grass-cutting blades of mowing-machines and the great defect in their operation.

Figure 1 represents the usual form of one of the teeth or sections of the grass-cutting blades in common use, drawn of the full size. They are made of steel and fastened with rivets or screws to an iron bar, by which they are moved alternately in opposite directions. A A represent its cutting-edges, each of which in turn gives a shearing cut as it is drawn through the fingers (or guard) next to it upon the machine, but not represented in the drawings. These fingers (or guards) are very apt to catch the tough fibrous grass or other substance, which it drawn into them by the teeth of the cutting-blade, and hold it till the cutters become clogged, and sometimes are prevented from cutting or moving. This is a serious defect in the operation of these machines, and several inventions have been made for overcoming the difficulty, none of which, however, have been found perfect in practice.

My invention consists in making a double set of teeth (or sections) to be attached to the sickle-bar, the one set being immediately behind the other. The foremost of these have cutting-edges in the usual form, beveled upon the under side, for cutting the grass, and the hindmost have blunt edges for clearing out tough grass or other substance that catches in the fingers, (or guards,) and also in the back guides which hold the blade down in its place.

Fig. 2 represents one of the sections of my grass-cutting blade, drawn of the full size, in which X is one of the foremost teeth, having two sharp edges, A A, beveled upon the under side. Y is one of the hindmost teeth, having two blunt edges, B B, and is placed so as to leave an opening, C D, between its edges and the back of the foremost tooth X. This opening C D is inclined in opposite directions from the middle line of the tooth X, and extends across the cutter-bar E, to which it is fastened. The object of the tooth Y and space C D is to keep the fingers and back guide clear from all obstructions, which it performs effectually.

Fig. 3 is a perspective view of the mower-sill with the fingers J J and the cutting-blade X X, the back guide K and the rolling guide R, and the hindermost teeth Y Y in their places. A A are the sharp edges; B B, the blunt edges of the hindermost teeth; C D, the spaces between the teeth; E, the cutter-bar; F, the sill; J J, the guard-fingers; K, back guide; R, the rolling guide. This is designed more effectually to keep the cutter-bar in its proper place, both to prevent its being crowded up or downward and to prevent the blades from being turned upward by the stubble, and thereby causing great friction, which usually happens when stationary back guides are used. It may be observed that this rolling guide, a section of which is seen at Fig. 5, has a flange which extends over two-thirds of the width of the cutter-bar.

Fig. 4 is a top view of the roller R.

Similar letters indicate the same parts in each figure.

The motion usually given allows the inclined space C and D to pass quite through the guard-fingers with a shearing motion, with the blunt edge clearing away any obstruction that may be drawn in between the blade and the finger. It also performs the same office where it passes under the back guide K. It does this completely, even with short stroke, whereas the mere opening in the middle of a cutting-blade requires a much longer stroke in order to effect the same purpose, and the long stroke is a great disadvantage by causing much more friction, more wear, and requiring much more power to cut the same quantity of grass at each stroke. A rolling guide clogs less than a stationary one.

Any requisite number of the rolling guides may be used and the stationary guides dispensed with. By this arrangement I avoid the close proximity of the bar and consequent pressure on all the guard-fingers, having always a space between them and the under side of the cutter-bar, which otherwise often will clog up.

I do not claim the cutting-blades in their usual form, nor do I claim the other parts, as they have hitherto been used; neither do I claim the tooth X (which may be made either in one piece or more) when used without the tooth Y; but

What I claim as my invention, and desire to secure by Letters Patent, is—

The use of the clearing-tooth Y in connection with the cutting-tooth X, in the manner and for the purpose as set forth in the above specification, provided the cutters be distinct and the spaces between them continue back to the rear of the cutter-bar. I do not limit myself to the exact form or proportions of either, for it is evident that either of them might be slightly varied without materially altering the effect.

In testimony whereof I hereto subscribe in presence of two witnesses.

ISRAEL S. LOVE.

Witnesses:
 JOHN L. SMITH,
 A. ARNOLD.